Feb. 7, 1933. D. S. SCHNELL ET AL 1,896,755
MEANS FOR TESTING WATTHOUR METERS
Filed Nov. 21, 1929
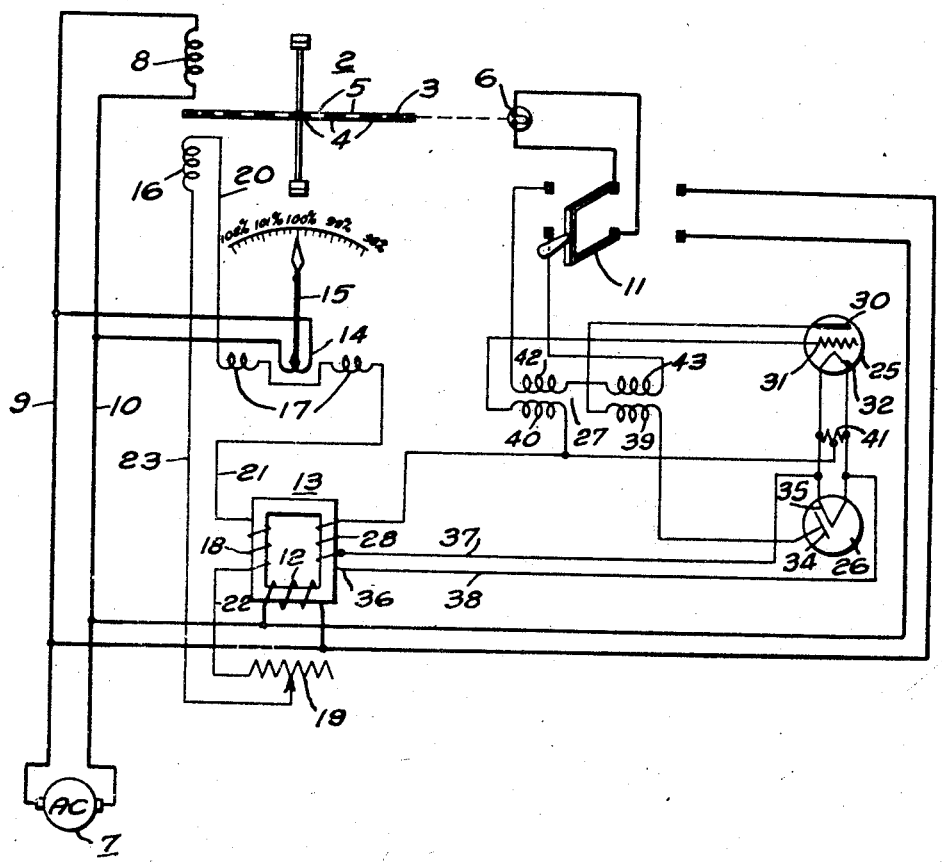
INVENTORS
Roy C. Fryer and
Douglas S. Schnell.
BY
ATTORNEY Patented Feb. 7, 1933

1,896,755

UNITED STATES PATENT OFFICE

DOUGLAS S. SCHNELL, OF FORT THOMAS, KENTUCKY, AND ROY C. FRYER, OF MOUNT WASHINGTON, OHIO, ASSIGNORS TO WESTINGHOUSE ELECTRIC AND MANUFACTURING COMPANY, A CORPORATION OF PENNSYLVANIA

MEANS FOR TESTING WATTHOUR METERS

Application filed November 21, 1929. Serial No. 408,846.

Our invention relates to electrical measuring, testing and calibrating devices and systems and more particularly to a method of and means for testing and calibrating rotating meters of the watthour type.

Our invention has for an object to provide a method of and means for obtaining the percent registration of a watthour meter.

Another object of our invention is to provide means for calibrating a watthour meter.

Another object of our invention is to provide means for lighting a lamp intermittently in accordance with a multiple of the frequency of the alternating potential of an alternating-current system.

A still further and a vital object of our invention is to utilize the frequency of the alternating electro-motive force energizing a watthour meter as a timing source with which to compare the speed of the rotating element of the meter at various loads.

In carrying our invention into effect, we translate the frequency of the electro-motive force energizing the meter into light pulsations and stroboscopically compare them with marks on the rotating element of the meter. Since the light pulsations are constant, any variation between the frequency of the light pulsations and the speed of the rotating element is caused by either the magnitude of the load on the meter or some inherent error in the meter itself. Our invention contemplates testing and calibrating a watthour meter by the use of the system frequency as a standard timing source.

The features of our invention which are believed to be novel and patentable will be pointed out in the claims appended hereto.

For a better understanding of our invention, reference is made to the following description and to the accompanying drawing in which the single figure is a diagrammatic view of a modification of a watthour metertesting and calibrating device constructed in accordance with our invention.

Referring to the drawing, an induction watthour meter 2 of the conventional type has a rotating element or armature disc 3, the periphery of which is provided with a number of equally spaced alternate light-absorbing and light-reflecting sections 4 and 5, respectively. This effect is produced either by polishing the periphery of the disc and painting the dark sections, or by milling the periphery of the disc at spaced points.

A lamp 6 is so positioned with respect to the disc 3 that its light is directed to the periphery of the disc for stroboscopic comparison with the alternate dark and light sections thereon when the disc rotates.

An alternating-current source of supply 7 having a constant frequency, such as 60 cycles per second, energizes the watthour meter 2 and the lamp 6. The voltage coil 8 of the watthour meter is connected to the A. C. generator 7 by means of conductors 9 and 10, which are also connected to the lamp 6 through a double-pole double-throw switch 11, the primary winding 12 of a loading transformer 13 and the moving coil 14 of a wattmeter 15.

The current coil 16 of the watthour meter 2, the stationary coils 17 of the wattmeter 15 and the secondary winding 18 of the loading transformer 13 are connected in a series circuit having a variable loading device, such as a resistor 19, by means of conductors 20, 21, 22 and 23. The current-coil circuit is energized from the A. C. generator 7 through the windings 12 and 18 of the loading transformer 13.

With the switch 11 thrown to right-hand position, the lamp 6 produces a pulsating light at a frequency the same as the frequency of the A. C. source, for example, a 60 cycle A. C. source will light the lamp 120 times per second. At the same time, the meter disc 3 rotates at a speed proportional to the magnitude of the variable load 19. The speed of the disc may be made proportional to the frequency of the light pulsations of the lamp, either by varying the load 19 or by changing the load adjustments of the meter itself.

When full load is imposed upon the meter, the disc should rotate at a fixed speed, which is arbitrarily made to correspond to the light pulsations of the lamp 6. That is, the marks on the disc appear stationary in the pulsating light of the lamp when the meter 2 is properly adjusted. At this load, the wattmeter 15 is calibrated to read 100% registration.

The wattmeter 15 is further calibrated to indicate the percent registration at the various loads necessary to bring the speed of the disc of the watthour meter into stroboscopic synchronism with the light pulsations of the lamp 6.

For full-load testing of the watthour meter to determine its percent registration, the load 19 is varied until the marks on the disc are in stroboscopic synchronism with the light pulsations from the lamp. The wattmeter 15 changes its indication in accordance with the load and, being calibrated in percent registration, indicates that quantity of the watthour meter.

For full-load calibration or adjustment of the watthour meter, the load 19 is changed until the wattmeter 15 indicates 100% registration or full-load. At this load, the meter disc should be in stroboscopic synchronism with the light pulsations. If not, the full-load adjustment of the watthour meter is changed to bring about this condition.

In our invention, there is further provided means for intermittently lighting the lamp 6 from the same source of supply 7, at a frequency that is a predetermined fraction of the frequency of the A. C. generator, whereby the watthour meter may be tested and calibrated at a light-load, such as 10% of its full-load.

We accomplish this phase of our invention by the use of a vacuum-tube oscillator 25, a rectifier 26, and an inductance 27, in combination with an auxiliary secondary winding 28 on the loading transformer 13.

The vacuum-tube oscillator 25 comprises the usual plate 30, grid 31 and filament 32 in an evacuated or partially evacuated vessel. The plate 30 is energized by the output from the rectifier 26, consisting of the usual plate 34 and filament 35. The filaments 32 and 35 are heated by current from a few turns 36 of the secondary winding 28 through conductors 37 and 38.

The plate 34 of the rectifier is connected to the plate 30 of the oscillator through one of the windings 39 of the inductance 27. The grid 31 of the oscillator 25 is connected, through the winding 40 of the inductance, to one of the terminals of the secondary winding 28. The latter is also connected to the center of a resistor 41 in parallel circuit with the filaments 32 and 35.

The specific oscillator circuit illustrated may obviously be varied in accordance with known practice to produce any desired value of frequency. The circuit, per se, is broadly old, but it constitutes an effective means for generating a voltage at a desired frequency.

The two remaining windings 42 and 43 of the inductance 27 are connected in series circuit with each other and to the left-hand terminals of the switch 11 that is associated with the lamp 6, so that, when the switch is in that position, the lamp produces a pulsating light at a frequency that is a predetermined fraction of the frequency of the A. C. source, for example, 10% of 120 or 12 pulsations per second, where the latter is a 60 cycle generator.

For light-load, the watthour meter is tested and calibrated in the same manner as for full-load described above, the load, of course, being reduced to the correct proportionate amount.

From a commercial viewpoint, it is only necessary that a watthour meter be tested and calibrated at full-load and light-load, as described above, but, if required, any number of testing loads may be used by simply energizing the lamp with the proper frequency of current pulsations.

In accordance with the provisions of the patent statutes, we have described the principle of operation of our invention, together with the apparatus which is now considered to represent a preferred embodiment thereof, but we desire to have it understood that the apparatus shown and described is only illustrative and that the invention may be embodied in other means.

We claim as our invention:

1. The combination with an alternating-current source of electro-motive force and an integrating meter to be tested having a disc marked for stroboscopic comparison and current and voltage windings, of means for testing said meter including a lamp for lighting the marks on said disc, a wattmeter calibrated in percent registration having voltage and current windings, a loading transformer having primary and secondary windings, and a variable load, means connecting said meters lamp, the voltage windings of said meters and said primary winding of said transformer in parallel circuit with said source of electro-motive force, and means connecting said load, the secondary winding of said transformer and the current windings of said meters in series circuit with each other.

2. The combination with a source of alternating electro-motive force of substantially constant frequency, a variable load associated with said source and an integrating meter connected to measure the energy transferred from said source to said load, of means associated with said source for producing a pulsating light in accordance with the alternations of the alternating electro-motive force thereof, means for stroboscopically comparing the speed of said meter with the frequency of said light pulsations, a wattmeter calibrated in percent registration connected to measure the power required by said load, and means for causing the frequency of said light pulsations to correspond to either the full-load or light-load of said watthour meter.

In testimony whereof, we have hereunto subscribed our names.

DOUGLAS S. SCHNELL.
ROY C. FRYER.